(12) United States Patent
Yeom

(10) Patent No.: US 12,498,757 B2
(45) Date of Patent: Dec. 16, 2025

(54) FOLDABLE DISPLAY DEVICE

(71) Applicant: LG Display Co., Ltd., Seoul (KR)

(72) Inventor: MoonSoo Yeom, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 229 days.

(21) Appl. No.: 18/080,406

(22) Filed: Dec. 13, 2022

(65) Prior Publication Data

US 2023/0205268 A1 Jun. 29, 2023

(30) Foreign Application Priority Data

Dec. 24, 2021 (KR) .................. 10-2021-0187397

(51) Int. Cl.
*G06F 1/16* (2006.01)

(52) U.S. Cl.
CPC .......... *G06F 1/1641* (2013.01); *G06F 1/1616* (2013.01); *G06F 1/1652* (2013.01); *G06F 1/169* (2013.01)

(58) Field of Classification Search
None
See application file for complete search history.

(56) References Cited

U.S. PATENT DOCUMENTS

| | | | | |
|---|---|---|---|---|
| 9,354,476 | B2 * | 5/2016 | Han ...................... | G06F 1/1616 |
| 10,287,808 | B2 * | 5/2019 | Zhang ..................... | E05D 7/00 |
| 10,407,955 | B2 * | 9/2019 | Kessler .................. | G06F 1/1681 |
| 11,048,295 | B1 * | 6/2021 | Smeeton ................. | G09F 9/301 |
| 11,061,436 | B2 * | 7/2021 | O'Neil .................. | G06F 1/1616 |
| 11,436,951 | B2 * | 9/2022 | Yoo ........................ | G06F 1/1641 |
| 11,733,735 | B2 * | 8/2023 | Liu ...................... | H04M 1/0216 |
| | | | | 361/679.01 |
| 11,792,947 | B2 * | 10/2023 | Kim ....................... | G06F 1/1641 |
| | | | | 361/807 |
| 2013/0216740 | A1 * | 8/2013 | Russell-Clarke ...... | B21D 31/04 |
| | | | | 219/121.72 |
| 2014/0123436 | A1 * | 5/2014 | Griffin .................. | G06F 1/1652 |
| | | | | 16/221 |
| 2016/0195901 | A1 * | 7/2016 | Kauhaniemi .......... | G06F 1/1652 |
| | | | | 361/679.27 |
| 2017/0094775 | A1 * | 3/2017 | Fan ........................ | H05K 1/028 |
| 2019/0173041 | A1 * | 6/2019 | Large ..................... | H10K 71/00 |
| 2019/0265756 | A1 * | 8/2019 | Jones ..................... | G06F 1/1616 |

FOREIGN PATENT DOCUMENTS

| | | | | |
|---|---|---|---|---|
| CN | 108122502 | A | 6/2018 | |
| CN | 116136230 | A * | 5/2023 | .......... G06F 1/1616 |
| KR | 10-0665229 | B1 | 1/2007 | |
| KR | 10-2020-0045583 | A | 5/2020 | |

* cited by examiner

*Primary Examiner* — Imani N Hayman
*Assistant Examiner* — Rashen E Morrison
(74) *Attorney, Agent, or Firm* — Birch, Stewart, Kolasch & Birch, LLP

(57) ABSTRACT

A foldable display device including a display panel including a folding area and a non-folding area, a back plate disposed on the display panel and supporting the display panel, and a frame disposed on the back plate and including a folding part in a region corresponding to the folding area. The folding part can include an opening hole that penetrates the frame and a bridge having one end fixed to the frame. The opening hole and the bridge can be provided in plural in the folding part. A plurality of the opening hole and a plurality of the bridge can be alternately disposed.

19 Claims, 8 Drawing Sheets

FOLDABLE DISPLAY DEVICE

CROSS-REFERENCE TO RELATED APPLICATIONS

This application claims the priority to Korean Patent Application No. 10-2021-0187397 filed on Dec. 24, 2021, in the Republic of Korea, the entire contents of which are hereby expressly incorporated by reference into the present application.

BACKGROUND

Field

The present disclosure relates to a foldable display device, and more particularly, to a foldable display device with improved rigidity.

Discussion of the Related Art

Display devices used for a computer monitor, a TV, a mobile phone, etc. can include an organic light emitting display (OLED) that emits light by itself, a liquid crystal display (LCD) that requires a separate light source, etc.

As display devices have been increasingly applied to diverse use such as a computer monitor, a TV and a personal mobile device, for example, display devices having a large display area and a reduced volume and weight have been studied for improvements.

Recently, a foldable display device that can be freely folded and unfolded by forming a display unit, lines and the like on a flexible substrate has attracted attention as a next-generation display device.

SUMMARY OF THE DISCLOSURE

An objective to be achieved by the present disclosure is to provide a foldable display device with improved rigidity.

Another objective to be achieved by the present disclosure is to provide a foldable display device in which damage caused by folding can be minimized.

Objectives of the present disclosure are not limited to the above-mentioned objectives, and other objectives, which are not mentioned above, can be clearly understood by those skilled in the art from the following descriptions.

According to an aspect of the present disclosure, the foldable display device includes a display panel including a folding area and a non-folding area. Further, the foldable display device includes a back plate disposed under the display panel and supporting the display panel. Further, the foldable display device includes a frame disposed under the back plate and including a folding part in a region corresponding to the folding area. The folding part includes an opening hole passes the frame and a bridge having a one end fixed to the frame, and includes a plurality of opening hole and a plurality of the bridge are alternately disposed. Thus, in the foldable display device according to an example embodiment of the present disclosure, although the frame is made of a rigid material, it can be folded by forming the plurality of opening hole and the plurality of bridges in the frame.

Other detailed matters of the example embodiments are included in the detailed description and the drawings.

According to the present disclosure, a frame made of a rigid material can be folded when a display panel is folded by forming a plurality of opening hole and a plurality of bridges in a folding area of the frame.

According to the present disclosure, the frame includes the plurality of opening hole each having a dot shape and the bridge which has a rectangular shape and whose one of four sides is not completely punched into a folding part and can be bent. Thus, a deformation in a surface of the frame can be minimized. Therefore, a degradation in flatness can be minimized.

According to the present disclosure, an air gap can be formed between the frame and the display panel by forming the plurality of opening hole and the plurality of bridges. Thus, rigidity of a foldable display device can be improved.

According to an aspect of the present disclosure, a foldable display device includes a display panel configured to display an image and be folded along a folding axis, a back plate to support the display panel, and a frame on the back plate, and including a plurality of bridges extending parallel to the folding axis, each bridge having a fixed end attached to the frame and a free end not attached to the frame.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
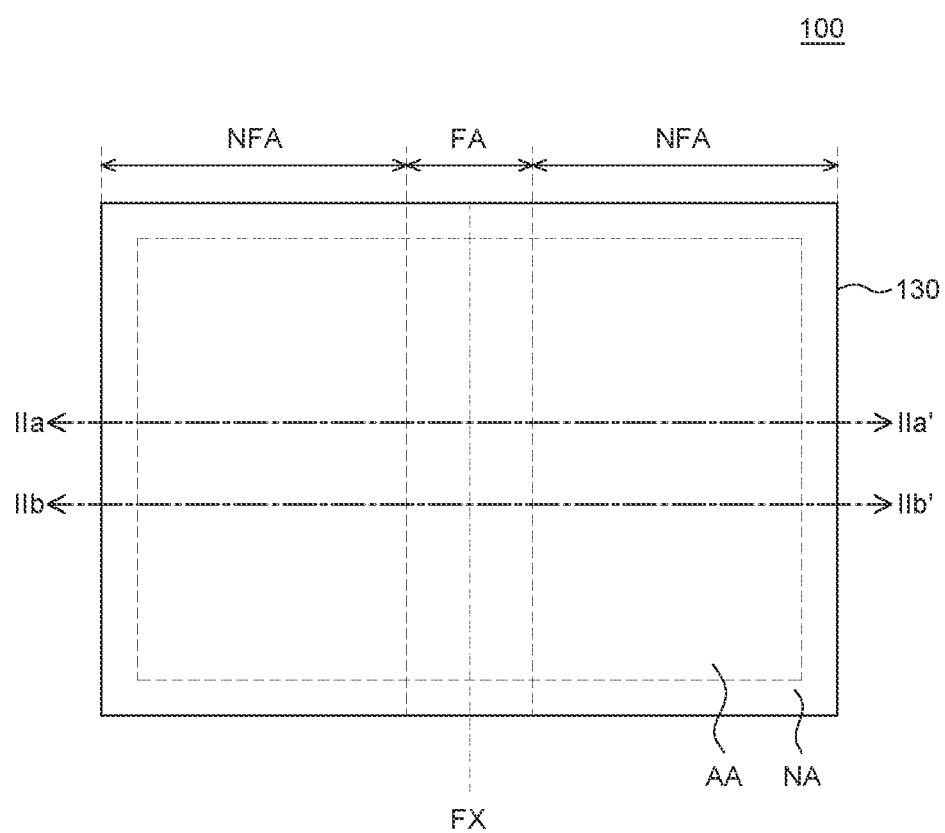
FIG. 1 is a plan view of a foldable display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, another layer or another element can be interposed directly on the other element or therebetween.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to accompanying drawings.

Figure 2A:
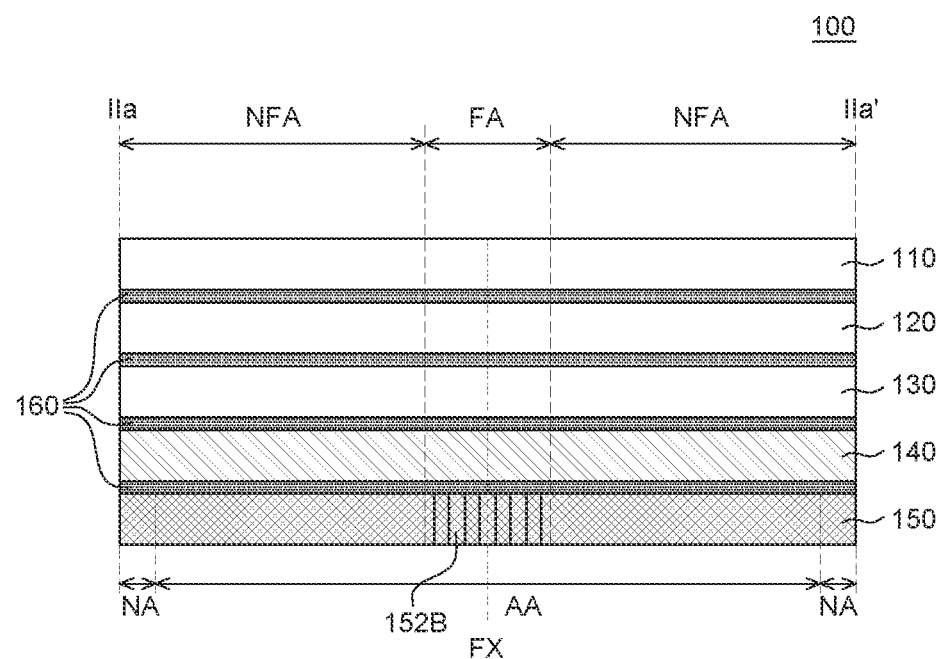
FIG. 2A is a cross-sectional view as taken along a line IIa-IIa' of FIG. 1.
Figure 2B:
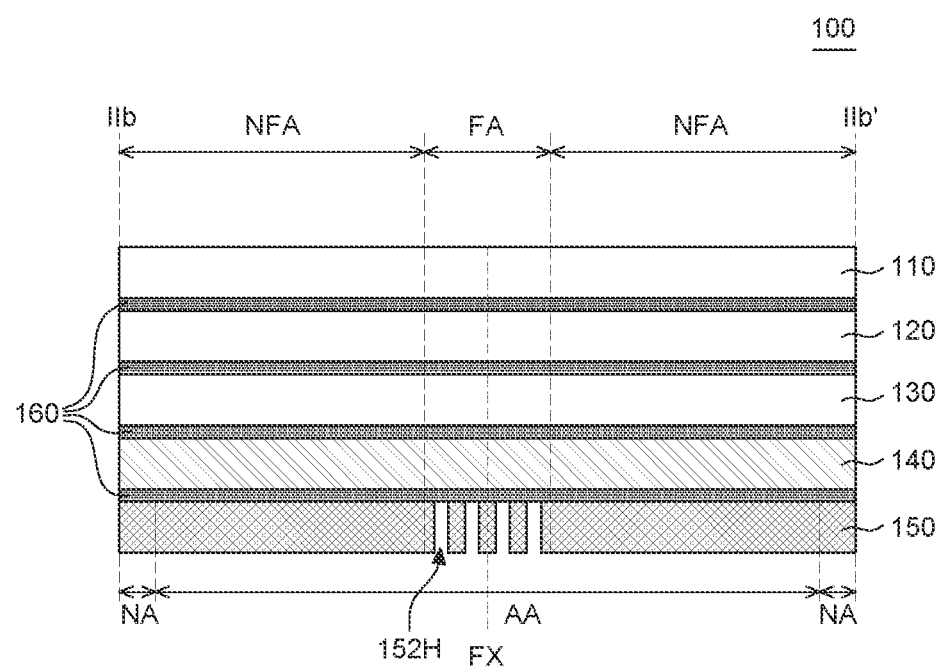
FIG. 2B is a cross-sectional view as taken along a line IIb-IIb' of FIG. 1.
Figure 3:
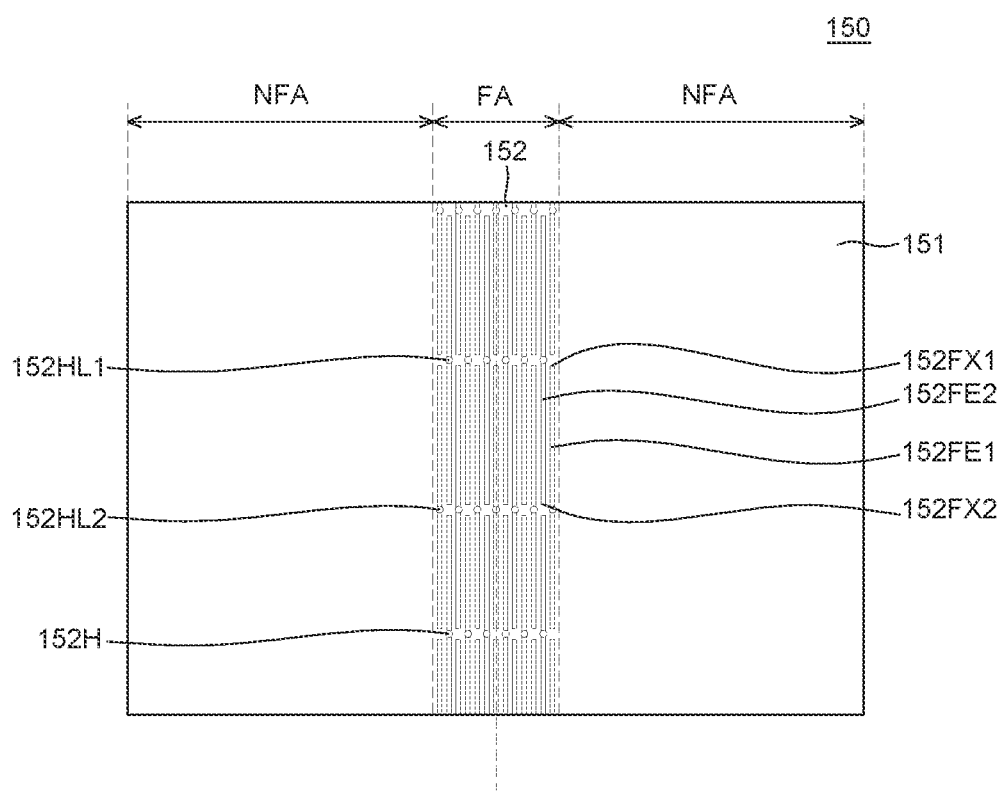
FIG. 3 is a plan view of a frame of the foldable display device according to an example embodiment of the present disclosure.
Figure 4:
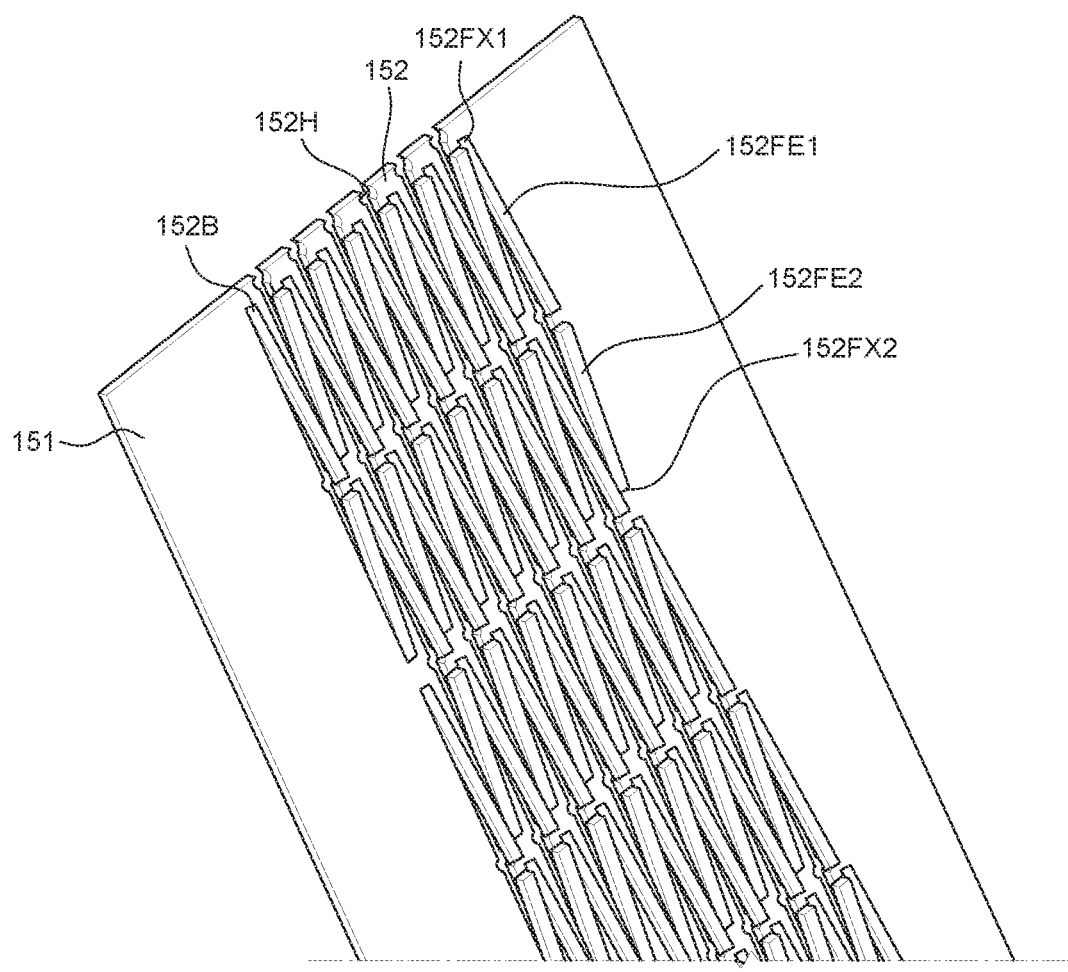
FIG. 4 is a perspective view of the frame of the foldable display device according to an example embodiment of the present disclosure.
Figure 5:
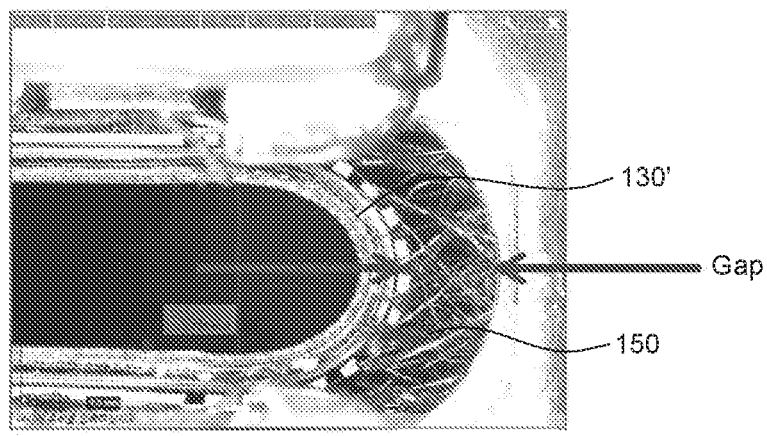
FIG. 5 is a side view of the foldable display device according to an example embodiment of the present disclosure in a folding state.

FIG. 1 is a plan view of a foldable display device according to an example embodiment of the present disclosure. FIG. 2A is a cross-sectional view as taken along a line IIa-IIa' of FIG. 1. FIG. 2B is a cross-sectional view as taken along a line IIb-IIb' of FIG. 1. FIG. 3 is a plan view of a frame of the foldable display device according to an example embodiment of the present disclosure. FIG. 4 is a perspective view of the frame of the foldable display device according to an example embodiment of the present disclosure. FIG. 5 is a side view of the foldable display device according to an example embodiment of the present disclosure in a folding state.

Referring to the examples of FIG. 1 through FIG. 5, a foldable display device 100 according to an example embodiment of the present disclosure includes a cover window 110, a polarizing layer 120, a display panel 130, a back plate 140, a frame 150 and one or more adhesive layers 160. The foldable device 100 can further include other layers and elements. All components of each foldable display device according to all embodiments of the present disclosure are operatively coupled and configured.

The display panel 130 is a panel in which an image is implemented. Display elements for implementing the image, and circuits, lines and components for driving the display elements can be disposed or included in the display panel 130.

The display panel 130 includes a display area AA and a non-display area NA. Further, the display panel 130 includes a folding area FA and a non-folding area NFA. For example, in the display panel 130, areas can be divided depending on whether the areas can display an image, and areas can also be divided depending on whether the areas are foldable. Thus, a specific area of the display panel 130 can be simultaneously a display area AA and a folding area FA.

The display area AA is an area where an image is displayed. Display elements for displaying an image and circuit units for driving the display elements can be disposed therein. For example, when the foldable display device 100 is an electroluminescent display device, the display element can include an electroluminescent element. For example, when the foldable display device 100 is a liquid crystal display device, the display element can include a liquid crystal element. Hereinafter, for the convenience of description, it is assumed that the foldable display device 100 according to various example embodiments of the present disclosure is a foldable display device 100 including electroluminescent elements, but the present disclosure is not limited thereto, and other types of light emitting elements such as light emitting diode elements can in included.

The circuit units can include various thin film transistors, capacitors and lines for driving the electroluminescent elements. For example, the circuit units can include various components such as a driving thin film transistor, a switching thin film transistor, a storage capacitor, a gate line and a data line, but are not limited thereto.

In the non-display area NA, an image is not displayed, and circuits, lines and components for driving the display elements disposed in the display area AA can be disposed. In the non-display area NA, driving circuits such as a gate driver or a data driver can be disposed. For example, the driving circuit can be mounted in the non-display area NA of the display panel 130 by a Gate In Panel (GIP) method or connected to the display panel 130 by a Tape Carrier Package (TCP) method or a Chip On Film (COF) method.

The non-display area NA can be defined as an area enclosing or encircling the display area AA as shown in FIG. 1. However, the non-display area NA can also be defined as an area extending from the display area AA or defined as an area where the display elements are not disposed, but is not limited thereto. For example, the non-display area NA can be an area located at a periphery of the display area AA.

Meanwhile, the display panel 130 can be defined as the display area AA and the non-display area NA or defined as the folding area FA and the non-folding area NFA, or both.

The folding area FA is an area in which the display panel 130 is folded with respect to a folding axis FX and can be folded with a specific radius of curvature when the display panel 130 is folded. The folding area FA can include a part of the display area AA and a part of the non-display area NA. Although it is illustrated in FIG. 1 that the folding axis FX is disposed at the center of the display panel 130, the position of the folding axis FX can vary. The folding area FA can also vary depending on the position of the folding axis FX, and is not limited to only that depicted in FIG. 1.

In the non-folding area NFA, the display panel 130 maintains a flat state. The non-folding area NFA can include a part of the display area AA and a part of the non-display area NA. The non-folding area NFA is an area extending to both sides of the folding area FA. For example, the non-folding areas NFA can be defined with the folding area FA therebetween. Further, when the foldable display device 100 is folded, the non-folding areas NFA on both sides of the folding area FA can be disposed to be opposite to each other. Additionally, the folding area FA can have various shapes. For example, the folding area FA can have a strip shape or a rectangular shape as shown in FIG. 1 as an example, but the folding area FA can also have other shapes, such as an oval shape, a circular shape, an hour-glass shape or a polygon shape, for example. Additionally, the folding area FA can be provided in plural. For example, at least two folding areas FA can be provided, whereby a non-folding area NFA can be interposed between adjacent at least two folding areas FA. When a plurality of folding areas FA are present, the folding areas FA and the non-folding areas NFA can be arranged alternatingly. Additionally, a plurality of folding axes FX can be provided. For example, each folding area FA can include a plurality of folding axes FX so that the plate 150 can include multiple folds or be folded at multiple locations. When the plate 150 includes a plurality of folding axes FX, the plurality of folding axes FX can be arranged parallel to each other, or one or more folding axes FX can be arranged to intersect or meet the other folding axes FX.

The polarizing layer 120 is disposed on the display panel 130. The polarizing layer 120 can selectively transmit light to reduce reflection of external light which is incident to the display panel 130. Specifically, the display panel 130 includes various metallic layers applied to thin film transistors, lines and electroluminescent elements. Therefore, external light incident to the display panel 130 can be reflected from the metallic layers so that visibility of the foldable display device 100 can be reduced due to the reflection of the external light. However, when the polarizing layer 120 is disposed, the polarizing layer 120 absorbs external light, which increases an ambient contrast ratio of the foldable display device 100. However, the configuration of the foldable display device 100 shown in FIG. 1, FIG. 2A and FIG. 2B is just an example, and the polarizing layer 120 can be omitted depending on an implementation example of the foldable display device 100.

In FIG. 2A and FIG. 2B, a touch panel can be further disposed between the polarizing layer 120 and the display panel 130. The touch panel is a device configured to sense a touch input of a user such as a screen touch of the foldable display device 100 or a gesture. The touch panel can be implemented as a resistive touch panel, an electrostatic touch panel, an optical touch panel or an electromagnetic touch panel.

The cover window 110 is disposed on the polarizing layer 120. The cover window 110 can protect the polarizing layer 120 and the display panel 130 against impact, moisture, heat and the like from the outside. The cover window 110 can be made of glass and can have a curved top surface.

The back plate 140 is disposed under the display panel 130. If a substrate including the display panel 130 is made of a plastic material such as polyimide (PI), the display device is manufactured in a state where a support substrate made of glass is disposed under the substrate. After the components such as the polarizing layer 120 are formed on the display panel 130, the support substrate can be released. The support substrate can be a glass substrate. However, after the support substrate is released, a component for supporting the substrate is needed. Therefore, the back plate 140 for supporting the substrate can be disposed under the substrate. Further, the back plate 140 can protect the display panel 130 against moisture, heat, impact and the like from the outside.

The frame 150 is disposed under the back plate 140. The frame 150 can protect the back plate 140, the display panel 130 and the like disposed on the frame 150.

The frame 150 can be made of a rigid material. For example, the frame 150 can be made of a metallic material such as steel use stainless (SUS) or invar, or plastic. Other metals or materials can be used. In other embodiments of the present disclosure, a combination of materials can be used, such as a combination of metal alloys or combination of a metal and a non-metal, for example, a resin can be used. However, if the material of the frame 150 satisfies physical conditions such as a thermal strain amount, a radius of curvature and a rigidity, the material can be diversely changed depending on the design and is not limited thereto. In one or more embodiments of the present disclosure, the frame 150 can have a rigidity that is greater than that of the back plate 140.

One or more adhesive layers 160 can be disposed between the other components of the foldable display device 100 to bond each component to another component. Specifically, the adhesive layer 160 can be disposed between the cover window 110 and the polarizing layer 120, between the polarizing layer 120 and the display panel 130, and between the back plate 140 and the frame 150, respectively. The adhesive layer 160 can be made of optical clear adhesive (OCA), pressure sensitive adhesive (PSA), or the like, but is not limited thereto.

Referring to the examples of FIG. 3 and FIG. 4, the frame 150 of the foldable display device 100 according to an example embodiment of the present disclosure includes a support part 151 and a folding part 152.

The support part 151 is an area maintaining a flat state so that the support part 151 is corresponded to the non-folding area NFA.

The folding part 152 is a flexible area to be included in the folding area FA. The folding part 152 has foldable properties so that the folding part 152 can be folded when the foldable display device 100 is folded.

The folding part 152 can include a plurality of opening hole 152H passing through or penetrating the frame 150 and a plurality of bridges 152B having fixing ends (or fixed ends) 152FX1 and 152FX2 of which one end is fixed to the frame 150. The plurality of opening hole 152H and the plurality of bridges 152B can be alternately disposed. For example, the opening hole 152H and fixing ends 152FX1 and 152FX2 disposed along the folding axis FX are alternately disposed at a uniform distance from each other. Meanwhile, the plurality of opening hole 152H and the plurality of bridges 152B can be alternately disposed in a direction intersecting the folding axis FX. The folding part 152 of the frame 150 can have bendable properties due to the plurality of opening hole 152H and the plurality of bridges 152B. For example, the plurality of opening hole 152H and the plurality of bridges 152B can be a pattern of the frame 150 in order for the frame 150 made of a rigid material to secure foldable properties.

Each of the plurality of opening hole 152H can have a circular shape or a dot shape, and the plurality of opening hole 152H can be disposed in a plurality of rows 152HL1 and 152HL2 in the direction intersecting the folding axis FX. In this case, the plurality of rows 152HL1 and 152HL2 can be spaced apart from each other at a distance equal to the length of a long side of the plurality of bridges 152B.

The plurality of rows 152HL1 and 152HL2 can include a plurality of first rows 152HL1 and a plurality of second rows 152HL2. the plurality of rows 152HL1 and 152HL2 includes a first row 152HL1 and a second row 152HL2 adjacent to the first row 152HL1, and the number of opening hole 152H in the second row 152HL2 is different from the number of opening hole 152H in the first row 152HL1. Further, the plurality of opening hole 152H can be composed of a first row 152HL1 including a plurality of opening hole 152H disposed in the direction intersecting the folding axis FX and a second row 152HL2 which is adjacent to the first row 152HL1 and includes a plurality of opening hole 152H. In this case, the plurality of first rows 152HL1 and the plurality of second rows 152HL2 can be alternately disposed.

The first row 152HL1 and the second row 152HL2 can be spaced apart from each other at a first distance in the same direction as the folding axis FX. In this case, the first distance can be equivalent to the length of the long side of the plurality of bridges 152B. Further, the plurality of opening hole 152H in each of the first row 152HL1 and the second row 152HL2 can be spaced apart from each other at a second distance in the direction intersecting the folding axis FX. In this case, the second distance can be equivalent to the length of a short side of the plurality of bridges 152B.

The number of opening hole 152H in the first row 152HL1 can be different from the number of opening hole 152H in the second row 152HL2. Specifically, an even number of opening hole 152H can be disposed in the first row 152HL1 and an odd number of opening hole 152H can be disposed in the second row 152HL2. For example, as shown in FIG. 3, six opening hole 152H can be disposed in the first row 152HL1, and seven opening hole 152H can be disposed in the second row 152HL2 adjacent to the first row 152HL1.

Each of the plurality of bridges 152B can have a rectangular shape having a long side and a short side and can extend in a direction parallel to the folding axis FX. For example, the long side of each of the plurality of bridges 152B can be parallel to the folding axis FX. In this case, the plurality of bridges 152B can be spaced apart from each other along the folding axis FX at a distance equal to the diameter of each opening hole 152H.

Meanwhile, the short side of each of the plurality of bridges 152B can extend in the direction intersecting the folding axis FX. For example, each bridge 152B has a long side and a short side, and the short side can extend in the direction intersecting the folding axis FX. In this case, the diameter of each opening hole 152H can be greater than the length of the short side of each bridge 152B.

The plurality of opening hole 152H is punched into the folding part 152. However, not all sides of a rectangular shape of each of the plurality of bridges 152B are punched into the folding part 152. One side of the short side of the rectangular shape can be formed into a bendable bridge and the other sides can be cut off from the folding part 152. More specifically, a first side of the short side of the rectangular shape of each of the plurality of bridges 152B can be formed into a bendable bridge. Further, second and fourth sides of the long side and a third side of the short side can be cut off from the folding part 152. In this case, the first side of the short side can be the fixing ends 152FX1 and 152FX2 of each of the plurality of bridges 152B. Further, the second and fourth sides of the long side and the third side of the short side can be free ends 152FE1 and 152FE2 of each of the plurality of bridges 152B. For example, all sides except the fixing ends 152FX1 and 152FX2 can be the free ends 152FE1 and 152FE2 separate from the frame 150. Since the plurality of bridges 152B is not completely punched into the folding part 152 and one side thereof extends from the folding part 152, a deformation in a surface of the frame 150 can be minimized. Therefore, a degradation in flatness of the foldable display device 100 according to an example embodiment of the present disclosure can be minimized.

A first fixing end 152FX1 of any one of the plurality of bridges 152B can be fixed on an upper end side of the folding axis FX. A first free end 152FE1 extending from the first fixing end 152FX1 can extend from the first fixing end 152FX1 toward a lower end side. Meanwhile, a second fixing end 152FX2 of another one of the plurality of bridges 152B adjacent to the one bridge in the direction intersecting the folding axis FX can be fixed on the lower end side of the folding axis FX. A second free end 152FE2 can extend from the second fixing end 152FX2 toward the upper end side. For example, the first fixing end 152FX1 and the second fixing end 152FX2 can be disposed in a zigzag pattern. For example, in bridges 152B disposed along the folding axis FX, free ends 152FE1 and 152FE2 of two bridges 152B can face each other with an opening hole 152H therebetween. The free ends 152FE1 and 152FE2 can communicate or be connected to the opening hole 152H. More specifically, when the first and second fixing ends 152FX1 and 152FX2 correspond to the first side of the rectangular shape, the first and second free ends 152FE1 and 152FE2 can correspond to the second, third and fourth sides of the rectangular shape of the folding part 152. In this case, the second, third and fourth sides can be cut off from the folding part 152. Further, the opening hole 152H can be adjacent to the fixing ends 152FX1 and 152FX2 in the direction intersecting the folding axis FX and can be in one-one correspondence with the fixing ends 152FX1 and 152FX2.

As described above, in the foldable display device 100 according to an example embodiment of the present disclosure, the plurality of opening hole 152H and the plurality of bridges 152B are disposed in the folding part 152 of the frame 150. Thus, as shown in FIG. 5, an air gap of 1 mm to 1.5 mm can be present between a display panel assembly 130' including the cover window 110, the polarizing layer 120, the display panel 130 and the back plate 140 and the frame 150. Therefore, the foldable display device 100 according to an example embodiment of the present disclosure can be improved in rigidity by forming the plurality of opening hole 152H and the plurality of bridges 152B in the folding part 152 of the frame 150.

Further, in the foldable display device 100 according to an example embodiment of the present disclosure, the plurality of opening hole 152H and the plurality of bridges 152B are disposed in the folding part 152 of the frame 150. Thus, the frame 150 can have flexibility. Therefore, damage caused by folding can be minimized.

Hereinafter, a method of manufacturing a frame of a foldable display device according to an example embodiment of the present disclosure will be described.

Figure 6A:
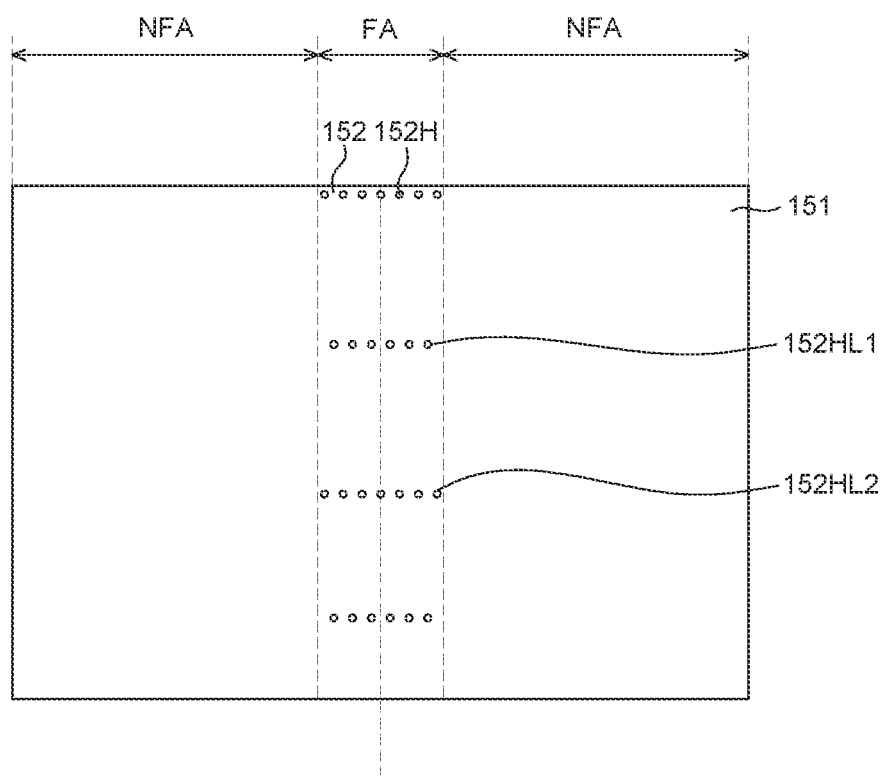
FIGS. 6A and 6B are plan views for explaining a method of manufacturing a frame of a foldable display device according to an example embodiment of the present disclosure.
Figure 6B:
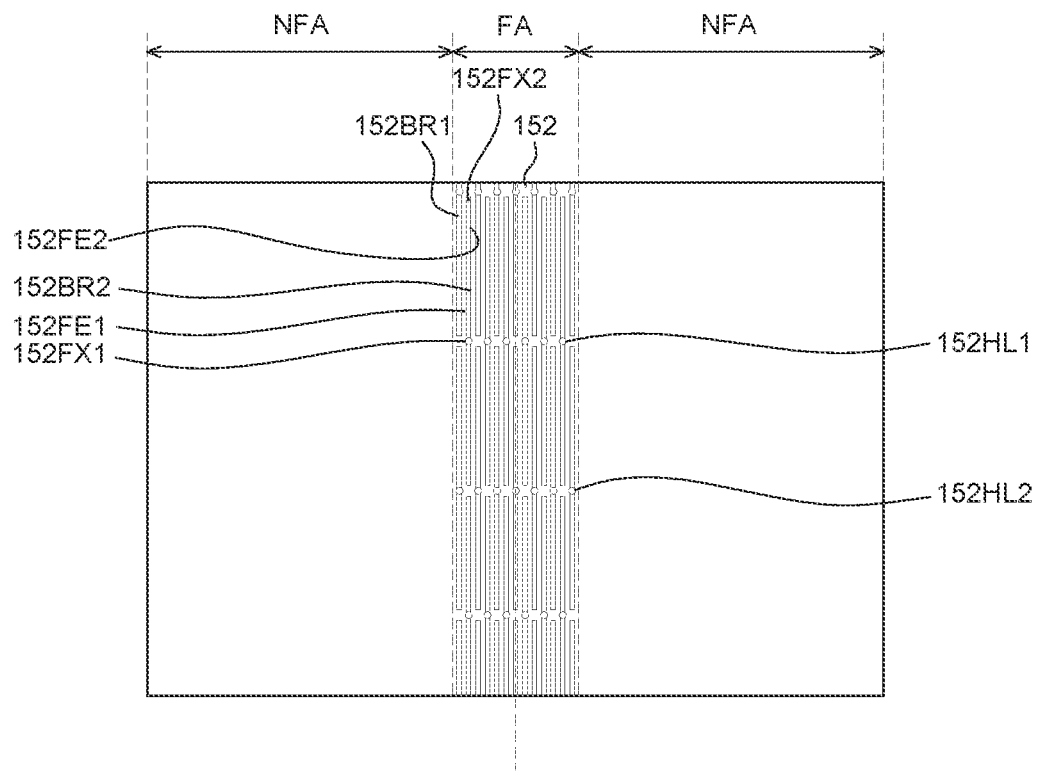

FIG. 6A and FIG. 6B are plan views for explaining a method of manufacturing a frame of a foldable display device according to an example embodiment of the present disclosure.

First, as shown in FIG. 6A, the plurality of opening hole 152H is punched into the folding part 152 of the frame 150 of the foldable display device 100 according to an example embodiment of the present disclosure. In this case, each of the plurality of opening hole 152H can be located at a central portion of a pattern for folding the frame 150. Further, the plurality of opening hole 152H can be disposed in a plurality of rows including the first rows 152HL1 and the second rows 152HL2. The plurality of first rows 152HL1 and the plurality of second rows 152HL2 can be alternately disposed to form a plurality of rows.

The first row 152HL1 and the second row 152HL2 can be spaced apart from each other at a first distance. In this case, the first distance can be equivalent to the length of a long side of a bridge. Further, the plurality of opening hole 152H in each of the first row 152HL1 and the second row 152HL2 can be spaced apart from each other at a second distance in the direction intersecting the folding axis FX. In this case, the second distance can be equivalent to the length of a short side of a bridge to be formed. Further, the number of opening hole 152H in the first row 152HL1 can be different from the number of opening hole 152H in the second row 152HL2.

Then, as shown in FIG. 6B, the plurality of bridges 152B can be formed around the plurality of opening hole 152H. The plurality of bridges 152B can be disposed in a plurality of first columns 152BR1 and a plurality of second columns 152BR2 in the direction intersecting the folding axis FX. In this case, the plurality of first columns 152BR1 and the plurality of second columns 152BR2 can be alternately disposed in the direction intersecting the folding axis FX.

The bridge 152B in the first column 152BR1 may not extend from an opening in the first row 152HL1 of the plurality of opening hole 152H. The bridge 152B in the second column 152BR2 can extend from the opening in the first row 152HL1 of the plurality of opening hole 152H. In other words, the first fixing end 152FX1 in the first column 152BR1 can be formed on the lower end side of the folding axis FX. Further, the second fixing end 152FX2 in the second column 152BR2 can be formed on the upper end side of the folding axis FX.

Meanwhile, the first free 152FE1 in the first column 152BR1 can extend from the first fixing end 152FX1 toward the upper end side of the folding axis FX. Further, the second free 152FE2 in the second column 152BR2 can extend from the second fixing end 152FX2 toward the lower end side of the folding axis FX.

Each component of a foldable display device in which a display area is foldable can be formed to have a very small thickness to be foldable. For example, a foldable display device having a small thickness can be flexibly deformed in response to stress generated in a folding direction and thus can be folded in the folding direction. However, as a display device becomes thinner, reliability of the display device is degraded. For example, as the thickness of a display panel decreases, rigidity of the display panel decreases and the display panel can be damaged even by a small impact from the outside. Accordingly, a frame made of a rigid material is disposed under the display panel to protect the display device against an impact from a lower direction of the foldable display device.

When the frame is disposed under the foldable display panel, a pattern is formed to provide elasticity in order for the frame made of a rigid material to secure foldable properties. In this case, the pattern of the frame for securing foldable properties can be formed through a chemical etching process. When the pattern of the frame is formed through the etching process, it takes time to perform the etching process. Thus, installation of an additional line is required for mass production.

Alternatively, the pattern of the frame for securing foldable properties can be formed through a press process, which is a physical process. When the pattern is formed through the press process, it takes less time than when the pattern of the frame is formed through the etching process, but the rigid material of the frame is deformed. Thus, surface flatness is degraded.

In the foldable display device 100 according to an example embodiment of the present disclosure, the plurality of opening hole 152H is formed first and then, the plurality of bridges 152B is formed around the plurality of opening hole 152H. Therefore, even if a pattern of the frame 150 for securing foldable properties is formed through the press process, a deformation of the rigid material can be minimized and surface flatness can be improved.

The example embodiments of the present disclosure can also be described as follows:

According to an aspect of the present disclosure, the foldable display device includes a display panel including a folding area and a non-folding area. Further, the foldable display device includes a back plate disposed under the display panel and supporting the display panel. Further, the foldable display device includes a frame disposed under the back plate and including a folding part in a region corresponding to the folding area. The folding part includes an opening hole passes the frame and a bridge having a one end fixed to the frame, wherein the number of the opening hole and the number of the bridge are plural in the folding part, and wherein a plurality of the opening hole and a plurality of the bridge are alternately disposed.

The opening hole can be different in shape from the bridge.

The opening hole can have any one of a circular shape and a dot shape.

The bridge can have a rectangular shape having a long side and a short side.

The bridge can have a shape having a long side and a short side.

The diameter of the opening can be greater than the length of the short side of the bridge.

The plurality of opening hole can be disposed in a first row including a plurality of opening hole disposed in plural in each of a plurality of rows along a direction intersecting the folding axis of the display device, the plurality of rows includes a first row and a second row adjacent to the first row.

The number of opening hole in the second row is different from the number of opening hole in the first row.

Each of the first row and the second row can be provided in plural, the plurality of the first row and the plurality of the second row can be spaced apart from each other at a first distance.

The first distance can be equivalent to the length of a long side of the bridge.

Each of a distance of between the plurality of opening hole in each of the first row and a distance of between the plurality of the opening hole in each of the second row can be a second distance.

The second distance can be equivalent to the length of a short side of the plurality of bridges.

The opening can be adjacent to the fixing end in a direction intersecting a folding axis of the display device and can be in one-one correspondence with the fixing end.

The long side of the bridge can be parallel to the folding axis.

The bridge can include the fixing end and free ends which are all sides except the fixed end is the one end of the bridge and separate from the frame.

The bridge can have a rectangular shape.

In bridges disposed on the same straight line along the folding axis among the plurality of bridges, free ends of two bridges can face each other with an opening hole therebetween.

A plurality of the opening hole and the one end of a plurality of the bridge disposed on the same straight line along a folding axis of the display device can be alternately disposed at a uniform distance from each other.

According to an aspect of the present disclosure, a foldable display device can include a display panel configured to display an image and be folded along a folding axis, a back plate to support the display panel, and a frame on the back plate, and including a plurality of bridges extending parallel to the folding axis, each bridge having a fixed end attached to the frame and a free end not attached to the frame.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A foldable display device, comprising:
    a display panel including a folding area and a non-folding area;
    a back plate disposed on the display panel and supporting the display panel; and
    a frame disposed on the back plate and including a folding part in a region corresponding to the folding area,
    wherein the folding part includes an opening hole penetrating the frame and a bridge having one end fixed to the frame,
    wherein the opening hole and the bridge are provided in plural in the folding part,
    wherein the plurality of opening holes and the plurality of bridges are alternately disposed,
    wherein the bridge includes a fixed end at the one end of the bridge and a free end separate from the frame, and
    wherein all sides of the bridge except the fixed end are the free end,
    wherein the plurality of opening holes are arranged in a plurality of rows along a direction intersecting a folding axis of the display device,
    wherein the plurality of rows include a first row and a second row adjacent to the first row, and
    wherein the number of the plurality of opening holes in the second row is different from the number of the plurality of opening holes in the first row.

2. The foldable display device according to claim 1, wherein each opening hole is different in shape from each bridge.

3. The foldable display device according to claim 2, wherein an opening hole among the plurality of opening holes is adjacent to the one end of a bridge among the plurality of bridges in a direction intersecting a folding axis of the display device and is in one-to-one correspondence with the one end of the bridge, and
    wherein a long side of the bridge is parallel to the folding axis.

4. The foldable display device according to claim 2, wherein each opening hole has any one of a circular shape and a dot shape, and
    wherein each bridge has a rectangular shape having a long side and a short side.

5. The foldable display device according to claim 1, wherein each bridge has a shape having a long side and a short side, and
    wherein a diameter of each opening hole is greater than a length of the short side of each bridge.

6. The foldable display device according to claim 1, wherein the bridge has a rectangular shape.

7. The foldable display device according to claim 1, wherein in bridges disposed on a same straight line along the folding axis among the plurality of bridges, free ends of two bridges face each other with an opening hole therebetween from among the plurality of opening holes.

8. The foldable display device according to claim 1, wherein the plurality of opening holes and the one ends of the plurality of bridges disposed on a same straight line along a folding axis of the display device are alternately disposed at a uniform distance from each other.

9. The foldable display device according to claim 1, wherein the display panel includes a display area to display an image and a non-display area that does not display the image, and
    wherein each of the folding area and the non-folding area includes a portion of the display area and a portion of the non-display area.

10. The foldable display device according to claim 1, further comprising an air gap disposed between the back plate and the frame.

11. The foldable display device according to claim 10, wherein the air gap is about 1 mm to 1.5 mm.

12. The foldable display device according to claim 1, wherein the free end of the bridge includes a cut that separates the bride from the folding part.

13. The foldable display device according to claim 1, wherein each of the first row and the second row is provided in plural,
    wherein the plurality of the first rows and the plurality of the second rows are spaced apart from each other at a first distance, and
    wherein the first distance is equivalent to a length of a long side of each bridge.

14. The foldable display device according to claim 13, wherein each of a distance between the plurality of opening holes in each of the plurality of first rows and a distance between the plurality of opening holes in each of the plurality of second rows are a second distance, and
    wherein the second distance is equivalent to a length of a short side of the plurality of bridges.

15. A foldable display device, comprising:
    a display panel configured to display an image and be folded along a folding axis;
    a back plate to support the display panel; and
    a frame on the back plate, and including a folding part folded when the foldable display device is folded,
    wherein the folding part includes a plurality of bridges extending parallel to the folding axis and a plurality of opening holes that penetrate through the frame,
    wherein each bridge has a fixed end attached to the frame and a free end not attached to the frame, wherein all sides of the plurality of bridges except the fixed end are the free end, wherein the plurality of the opening holes and the plurality of the bridges are alternately disposed, wherein the plurality of opening holes are arranged in a plurality of rows along a direction intersecting the folding axis of the foldable display device, wherein the plurality of rows includes a first row and a second row adjacent to the first row, and wherein the number of the plurality of opening holes in the second row is different from the number of the plurality of opening holes in the first row.

16. The foldable display device according to claim 15, wherein the frame further includes a support part, and wherein the support part maintains a flat state when the foldable display device is folded.

17. The foldable display device according to claim 15, wherein the free ends of the plurality of bridges communicate with the plurality opening holes, respectively.

18. The foldable display device according to claim 15, wherein the fixed ends attached to the frame and the free ends not attached to the frame of the plurality of bridges are arranged alternatingly along a direction that intersects the folding axis.

19. The foldable display device according to claim 15, wherein a rigidity of the back plate is greater than that of the display panel.

\* \* \* \* \*